US006460238B1

(12) United States Patent
LaRue et al.

(10) Patent No.: US 6,460,238 B1

(45) Date of Patent: Oct. 8, 2002

(54) PLASTIC BAG SLIDER AND END TERMINATION INSTALLATION ASSEMBLY AND METHOD

(75) Inventors: Jon M. LaRue, Fairport, NY (US); Craig E. Cappel, Pittsford, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 09/911,438

(22) Filed: Jul. 24, 2001

(51) Int. Cl.[7] .......................... B29D 5/00; A41H 37/06; B23P 21/00

(52) U.S. Cl. ............................ 29/408; 29/766; 29/767; 29/768; 29/771

(58) Field of Search ........................... 29/408, 766–768, 29/771

(56) References Cited

U.S. PATENT DOCUMENTS

| | | | | |
|---|---|---|---|---|
| 3,172,443 A | | 3/1965 | Ausnit | 150/3 |
| 3,226,787 A | | 1/1966 | Ausnit | 24/201 |
| 3,259,951 A | | 7/1966 | Zimmerman | 24/201 |
| 3,780,781 A | | 12/1973 | Uramoto | 150/3 |
| 3,973,312 A | * | 8/1976 | Douri et al. | 29/768 |
| 4,196,030 A | | 4/1980 | Ausnit | 156/91 |
| 4,262,395 A | | 4/1981 | Kosky | 24/201 |
| 4,337,889 A | | 7/1982 | Moertel | 229/62 |
| 4,666,423 A | | 5/1987 | Herrington | 493/394 |
| 4,787,754 A | | 11/1988 | Herrington | 383/63 |
| 4,906,310 A | | 3/1990 | Broderick et al. | 156/66 |
| 4,923,309 A | | 5/1990 | VanErden | 383/5 |
| 4,927,271 A | | 5/1990 | Branson | 383/5 |
| 4,966,470 A | | 10/1990 | Thompson et al. | 383/61 |
| 4,971,454 A | | 11/1990 | Branson et al. | 383/61 |
| 5,007,142 A | | 4/1991 | Herrington | 24/400 |
| 5,007,143 A | | 4/1991 | Herrington | 24/400 |
| 5,010,627 A | | 4/1991 | Herrington et al. | 24/400 |

(List continued on next page.)

FOREIGN PATENT DOCUMENTS

| | | |
|---|---|---|
| EP | 0 051 010 A1 | 5/1982 |
| GB | 2 085 519 A | 4/1982 |

OTHER PUBLICATIONS

PCT Search Report for International Application No. PCT/US00/23542, dated Nov. 6, 2000.

*Primary Examiner*—P. W. Echols
(74) *Attorney, Agent, or Firm*—Jenkens & Gilchrist

(57) ABSTRACT

An assembly and method for installing sliders and end terminations onto a reclosable zipper for plastic bags is disclosed. The assembly includes a base with a cam path. A rotor is mounted on the base and includes at least one slider installing member and at least one end termination installing member. The rotor includes a cam follower extending into the cam path and secured to one of the slider installing member and end termination installing member which is reciprocally mounted on the rotor and is reciprocated by the interaction of the cam path and cam follower. At a first point in the rotation of the rotor the slider installing member and the termination installing member are supplied with sliders and terminations. At a second point in the rotation of the rotor the slider and terminations are simultaneously installed onto a zipper.

20 Claims, 3 Drawing Sheets

U.S. PATENT DOCUMENTS

| | | | | | |
|---|---|---|---|---|---|
| 5,020,194 | A | | 6/1991 | Herrington et al. | 24/400 |
| 5,023,122 | A | | 6/1991 | Boeckmann et al. | 428/43 |
| 5,063,644 | A | | 11/1991 | Herrington et al. | 24/400 |
| 5,067,208 | A | | 11/1991 | Herrington, Jr. et al. | 24/400 |
| 5,070,583 | A | | 12/1991 | Herrington | 24/400 |
| 5,077,064 | A | | 12/1991 | Hustad et al. | 426/106 |
| 5,088,971 | A | | 2/1992 | Herrington | 493/203 |
| 5,092,684 | A | | 3/1992 | Weeks | 383/61 |
| 5,092,831 | A | | 3/1992 | James et al. | 493/394 |
| 5,116,301 | A | | 5/1992 | Robinson et al. | 493/215 |
| 5,121,997 | A | | 6/1992 | La Pierre et al. | 383/203 |
| 5,129,734 | A | | 7/1992 | Van Erden | 383/61 |
| 5,131,121 | A | | 7/1992 | Herrington, Jr. et al. | 24/436 |
| 5,152,613 | A | | 10/1992 | Herrington, Jr. | 383/63 |
| 5,161,286 | A | | 11/1992 | Herrinton, Jr. et al. | 24/387 |
| 5,186,543 | A | | 2/1993 | Cochran | 383/203 |
| 5,189,764 | A | | 3/1993 | Herrington et al. | 24/387 |
| 5,211,482 | A | | 5/1993 | Tilman | 383/202 |
| 5,224,779 | A | | 7/1993 | Thompson et al. | 383/5 |
| 5,241,742 | A | * | 9/1993 | Sawada | 29/767 |
| 5,283,932 | A | | 2/1994 | Richardson et al. | 24/400 |
| RE34,554 | E | | 3/1994 | Ausnit | 383/63 |
| 5,301,394 | A | | 4/1994 | Richardson et al. | 24/399 |
| 5,301,395 | A | | 4/1994 | Richardson et al. | 24/400 |
| RE34,674 | E | | 7/1994 | Beakley et al. | 310/12 |
| 5,405,478 | A | | 4/1995 | Richardson et al. | 156/308.4 |
| 5,426,830 | A | | 6/1995 | Richardson et al. | 24/430 |
| 5,431,760 | A | | 7/1995 | Donovan | 156/66 |
| 5,435,864 | A | | 7/1995 | Machacek | 156/66 |
| 5,442,837 | A | | 8/1995 | Morgan | 24/400 |
| 5,442,838 | A | | 8/1995 | Richardson et al. | 24/402 |
| 5,448,807 | A | | 9/1995 | Herrington, Jr. | 24/399 |
| 5,448,808 | A | | 9/1995 | Gross | 24/400 |
| 5,456,928 | A | | 10/1995 | Hustad et al. | 426/87 |
| 5,480,230 | A | | 1/1996 | May | 383/9 |
| 5,482,375 | A | | 1/1996 | Richardson et al. | 383/64 |
| 5,669,715 | A | | 9/1997 | Dobreski | 383/5 |
| 5,713,669 | A | | 2/1998 | Thomas | 383/204 |
| 5,775,812 | A | | 7/1998 | St. Phillips et al. | 383/5 |
| 5,776,045 | A | | 7/1998 | Bodolay et al. | 493/215 |
| 5,782,733 | A | | 7/1998 | Yeager | 493/213 |
| 5,823,933 | A | | 10/1998 | Yeager | 493/213 |
| 5,827,163 | A | | 10/1998 | Kettner | 493/211 |
| 5,833,791 | A | | 11/1998 | Bryniarski | 156/244.25 |
| 5,867,875 | A | | 2/1999 | Beck et al. | 24/400 |
| 5,871,281 | A | | 2/1999 | Stolmeier et al. | 383/64 |
| 5,896,627 | A | | 4/1999 | Cappel et al. | 24/400 |
| 5,902,047 | A | | 5/1999 | Yeager | 383/203 |
| 5,911,508 | A | | 6/1999 | Dobreski et al. | 383/5 |
| 5,924,173 | A | | 7/1999 | Dobreski et al. | 24/400 |
| 5,947,603 | A | | 9/1999 | Tilman | 383/64 |
| 5,956,924 | A | | 9/1999 | Thieman | 53/412 |
| 5,964,532 | A | | 10/1999 | St. Phillips et al. | 383/5 |
| 5,969,904 | A | | 10/1999 | Alt et al. | 360/104 |
| 6,003,582 | A | | 12/1999 | Blohowiak et al. | 156/567 |
| 6,021,021 | A | | 2/2000 | Alt et al. | 360/104 |
| 6,045,493 | A | | 4/2000 | Totani | 493/201 |
| 6,098,369 | A | | 8/2000 | Bodolay et al. | 53/133.4 |
| 6,117,060 | A | | 9/2000 | Bodolay | 493/213 |
| 6,161,271 | A | | 12/2000 | Schreiter | 29/408 |
| 6,178,722 | B1 | | 1/2001 | McMahon | 53/412 |
| 6,199,256 | B1 | | 3/2001 | Revnew et al. | 29/408 |

* cited by examiner

PLASTIC BAG SLIDER AND END TERMINATION INSTALLATION ASSEMBLY AND METHOD

FIELD OF THE INVENTION

The present invention relates to an assembly and method for installing sliders and end terminations onto a zipper for plastic bags.

BACKGROUND OF THE INVENTION

Reclosable plastic bags are used for storage of food and a variety of other items. These bags include an open mouth for filling the bag. A reclosable zipper is secured to the mouth for closing the mouth when desired. One form of reclosable zipper used is a pinch to close, pull to open zipper. Another form of reclosable zipper includes a slider that is moved along the zipper between end termination clips to open and close the zipper. An example of this bag and zipper is disclosed in U.S. Pat. No. 5,067,208.

In the manufacture of reclosable plastic bags that are opened and closed using a slider, it is desirable to install the slider onto the zipper as fast as possible so as not to slow down the speed of the bag making machinery. Several methods of inserting sliders onto a fastener using a rotary process have been proposed. Examples can be found in U.S. Pat. Nos. 6,161,271 and 6,199,256 B1 and United Kingdom Patent Application No. 2,085,519 A.

These proposed processes, however, do not insert end termination clips onto the zipper and a separate machine is required to insert end clips. These additional machines increase the cost of making bags and reduce the speed at which the bags can be made. It is desirable to provide an assembly and method for simultaneously installing a slider and end termination clips onto a zipper without slowing down the bag making process and without unduly increasing the cost of making bags.

SUMMARY OF THE INVENTION

The present invention is directed to an assembly and method for installing sliders and end terminations onto reclosable zippers for plastic bags.

The assembly for installing sliders and end terminations onto a zipper includes a base having a cam path. A rotor is mounted on the base and includes a cam follower that fits into the cam path. At least one slider installation member and one end termination installation member are mounted on the rotor one of which is rigidly secured to the rotor and the other is reciprocally mounted on the rotor. The cam follower is connected to the slider installation member or end termination installation member that is reciprocally mounted on the rotor and reciprocates this nest as the cam follower moves in the cam path. A motor rotates the rotor moving the slider installation member to an assembly of sliders and a slider is inserted into the slider installation member. Simultaneously, the end termination installation member is moved to a supply of end terminations and end terminations are inserted into the end termination installation member.

The slider installation member and end termination installation member are then rotated to a position adjacent to a zipper and the slider and end termination are simultaneously mounted onto a zipper on a web of bag film. The zipper and web are then cut between adjacent end terminations to form separate bags each with a slider and an end termination clip on the zipper. This method of installing sliders and end terminations onto a zipper does not slow down the bag making operation and requires only a single insertion machine.

BRIEF DESCRIPTION OF THE DRAWINGS

Other objects and advantages of the invention will become apparent upon reading the following detailed description in conjunction with the drawings in which.

DETAILED DESCRIPTION OF THE PREFERRED EMBODIMENTS

The present invention can be used for installing sliders and end terminations on reclosable zippers or fasteners of the type used on plastic bags. Examples of the sliders, end terminations and zippers of this type can be found in U.S. Pat. Nos. 5,067,208 and 5,088,971. It is desirable to install sliders and end terminations on zippers alone or on zippers attached to a web of film or plastic bags at the same speed as that of a bag making machine. Currently, there are procedures for installing a slider on a reclosable package. These procedures are disclosed in U.S. Pat. Nos. 6,161,271 and 6,199,256 B1. No known system, however, simultaneously installs sliders and end terminations by a single machine.

Figure 1:
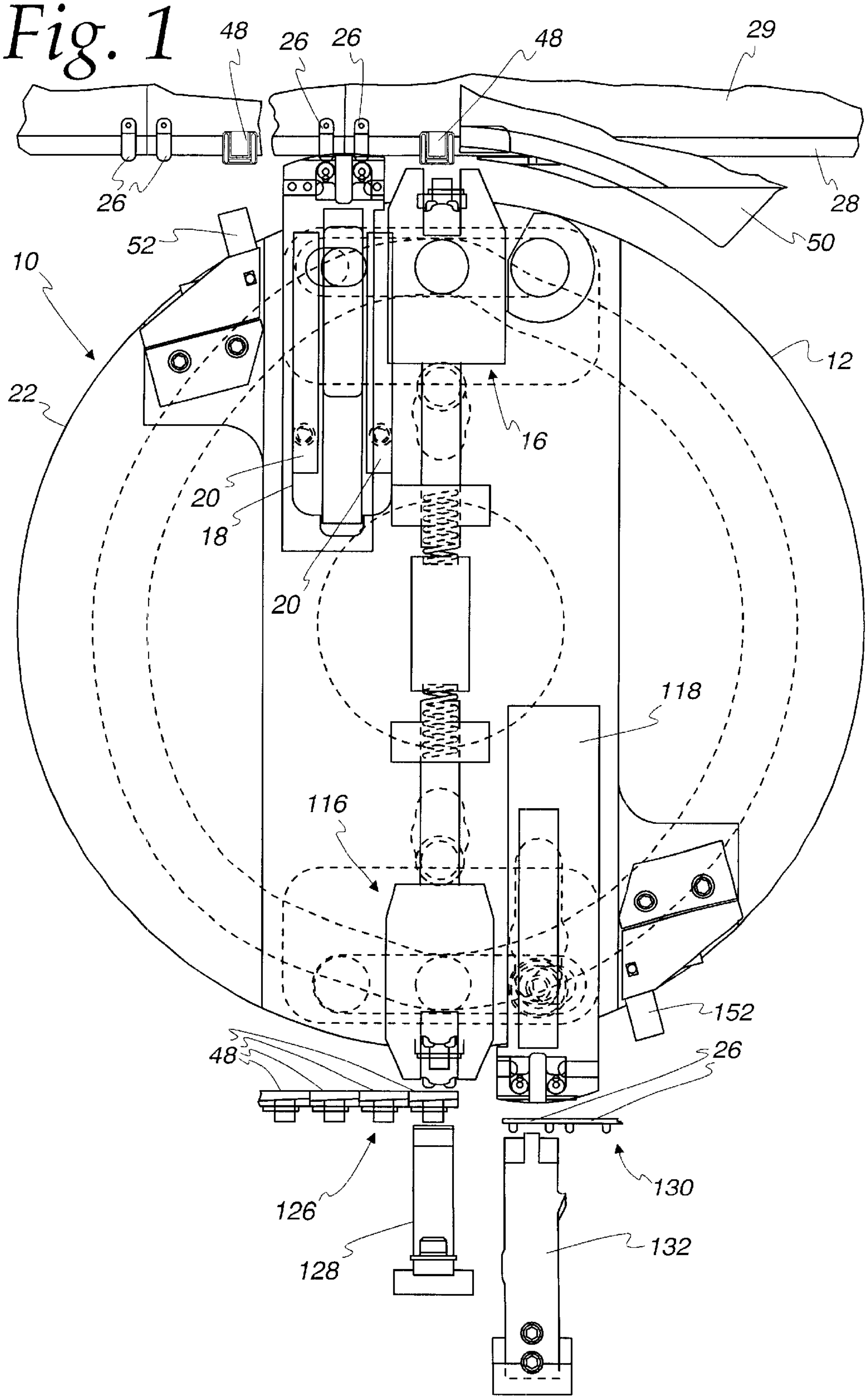
FIG. 1 is a schematic plan view of a slider and termination installation assembly.
Figure 2:
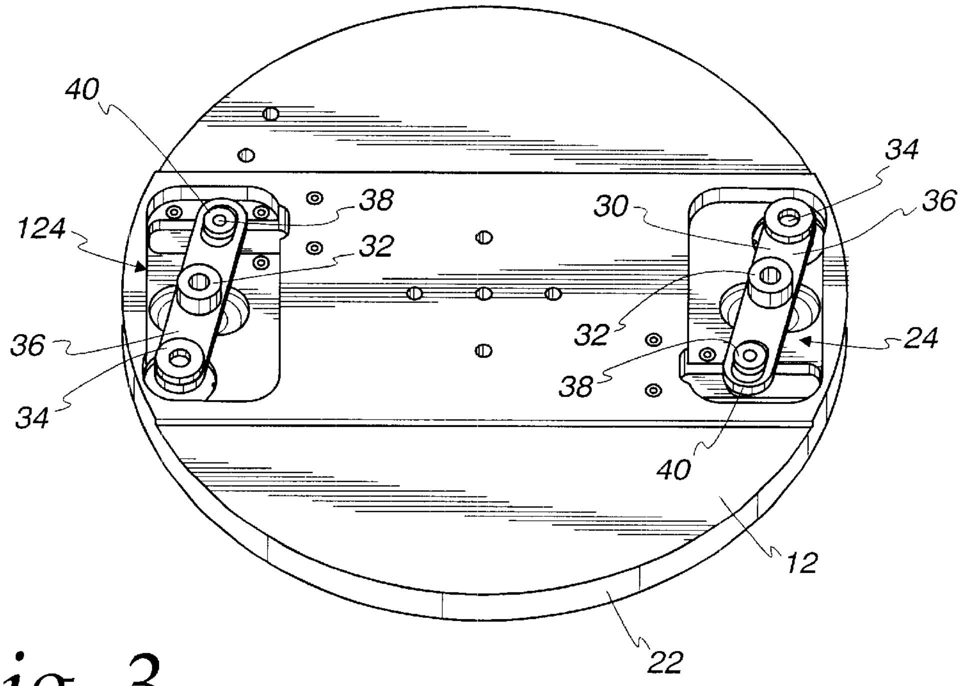
FIG. 2 is a bottom plan view of a rotor in the slider and termination installation assembly of FIG. 1.
Figure 3:
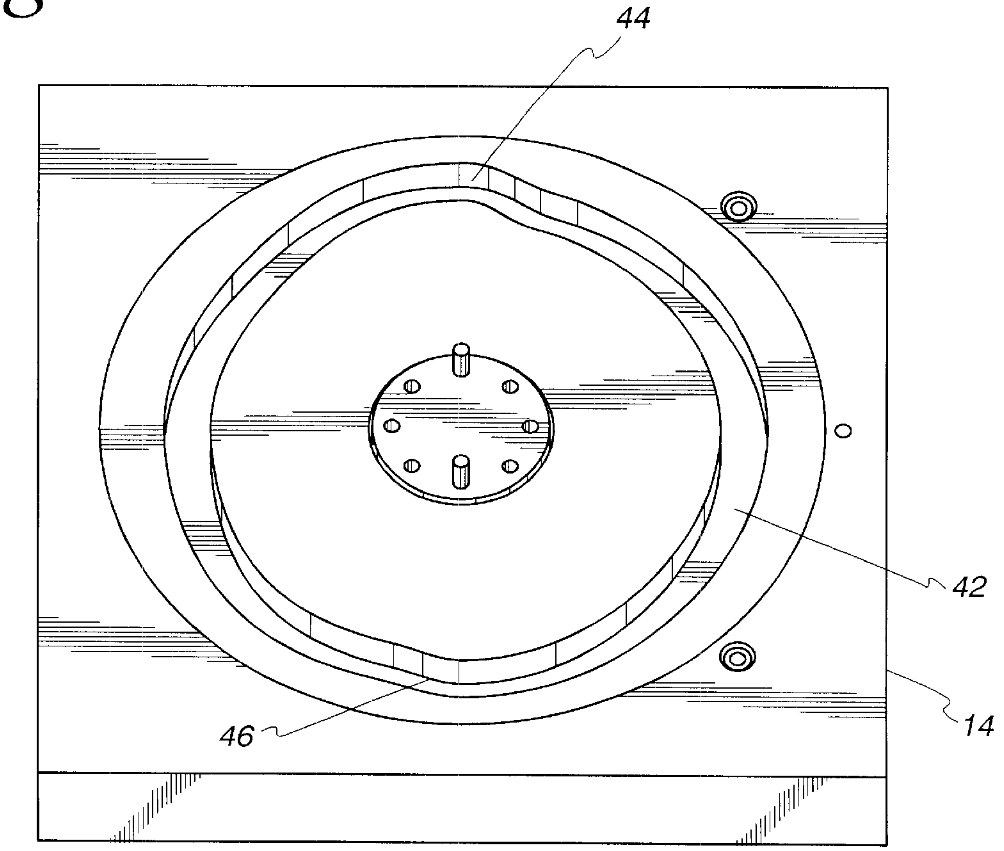
FIG. 3 is a top plan view of a base in the slider and termination installation assembly of FIG. 1.

The current invention simultaneously installs sliders and end terminations on reclosable zippers, on webs or film of plastic bags. The end terminations can be clips, ultrasonic welds or a crushed zipper track. Referring to FIGS. 1–3 there is illustrated an installation assembly 10 which includes a rotor 12 mounted on a base 14. The rotor 12 is preferably circular but can be other configurations. The base 14 is illustrated as a square configuration but can be any configuration.

The rotor 12 includes a first slider nest or installation member 16 that is rigidly fixed to the rotor 12. The rotor 12 also includes a first termination installation member or clip nest 18 reciprocally mounted on the rotor 12. The first termination installation member 18 is mounted on linear bearings 20 that allow the first termination installation member 18 to reciprocate in and out relative to a rim 22 of the rotor 12. The first termination installation member 18 can install termination clips on a zipper 28 or apply an ultrasonic weld or other termination. The zipper or fastener 28 is illustrated on a web 29 of film that is formed into a plastic bag, but the zipper 28 also may be unattached.

The first slider installation member 16 is mounted on a diametric line passing through the center of the rotor 12. The first termination installation member 18 is mounted on the rotor 12 adjacent the first slider installation member 16. To install sliders and terminations simultaneously on the zipper 28, the outer ends of the installation members 16, 18 must be parallel and in line at the point of installation. This requires that the termination installation member 18 extend farther than the slider installation member 16. In order to avoid contacting other parts of the assembly 10 during rotation of the rotor 12, the termination installation member 18 is retracted after installing an end termination.

The first termination installation member 18 is reciprocated by a first reciprocation assembly 24 (FIG. 2) mounted below the first termination installation member 18 on the underside of the rotor 12. The first reciprocation assembly 24 includes a bar or lever 30 pivotally mounted on the rotor 12 by a pivot pin 34. A pivot pin 34 is attached to a first end 36 of the bar 30 and to the first termination installation member 18. A cam follower 38 is mounted on a second end 40 of the bar 30.

The base 14 includes a cam track 42 (FIG. 3) that is substantially circular but includes a first radially outward undulation 44 and a second radially outward undulation 46 spaced approximately 180° apart along the circular cam track 42.

The rotor 12 is rotatably mounted on the base 14 with the cam follower 32 positioned in the cam track 42. During operation, the rotor 12 is rotated in a counterclockwise direction as viewed in FIG. 1. As the rotor 12 is rotated, the cam follower 32 travels along the cam track 42 retracting the first termination installation member 18 and holding it in a retracted position inward of the position shown in FIG. 1. As the cam follower 32 approaches the first undulation 44, the bar 30 is pivoted to extend the first termination installation member 18 such that its end is adjacent the end of the first slider installation member 16 and both ends are adjacent the zipper 28. A slider 48 and a pair of end terminations such as the clips 26 are installed. As the rotation of the rotor 12 is continued, the cam follower 32 moves over and beyond the first undulation 44, and the bar 30 is pivoted to retract the first termination installation member 18. This extension and retraction of the first termination installation member 18 positions the first installation member 18 in line with the first slider installation member 16 adjacent the zipper 28 to allow installation of terminations simultaneous with the installation of a slider 48 onto the zipper 28 but also retracts the first termination member 18 to prevent or inhibit engagement with other parts of the assembly 10 during rotation of the rotor 12.

The installation assembly 10 also includes a plow 50 that opens the zipper 28 by separating the tracks of the zipper 28 thereby allowing a slider 48 to be installed on the zipper 28. Although the zipper 28 is open for the installation of a slider 48, it is preferable that the zipper 28 is closed at the location of the installation of the end terminations. For this reason, a first closing roller 52 is mounted on the rotor 12 to engage and roll along the zipper 28. The spacing of the first closing roller 52 relative to the first slider installation member 16 and the first termination installation member 18 is such that the zipper 28 is closed by the roller 52 except for that portion of the zipper 28 adjacent the first slider installation member 16. This portion of the zipper 28 is open allowing installation of a slider 48 while further upstream the zipper 28 is closed adjacent the first termination installation member 18 to allow installation of terminations.

The installation assembly 10 also includes a second slider installation member 116 that is identical to the first slider installation member 16 and is rigidly secured to the rotor 12 along a diametric line of the rotor 12 and opposite to the first slider installation member 16. A second termination installation member 118 is also mounted on the rotor 12 adjacent the second slider installation member 116. The second termination installation member 118 is reciprocally mounted on the rotor 12 on linear bearings and is reciprocated by a second reciprocation assembly 124 mounted on the underside of the rotor 12. The first and second reciprocation assemblies 24 and 124 are identical and the same parts in each are identified by the same reference numeral.

The installation assembly 10 also includes a second closing roller 152. The second closing roller 152 functions in the same way as the first closing roller 52 to close the zipper 28.

A plurality 126 of sliders 48 is supplied to a slider insertion tool 128 located adjacent to the rotor 12 and the undulation 46 in the cam track 42. As the first slider installation member 16 or the second slider installation member 116 is rotated to a position adjacent the slider insertion tool 128, a slider 48 is inserted into slider installation member 16 or 116. At the same time, a slider 48 is being installed on the zipper by the other slider installation member 16.

If the end terminations to be put on the zipper 28 are clips 26 or similar elements, a plurality 30 of clips 26 are supplied to a clip insertion tool 132. As the first termination installation member 18 or the second termination installation member 118 is rotated to a position adjacent the clip insertion tool 132, a pair of clips 26 are inserted into the termination installation member 18 or 118. At the same time, a pair of clips 26 are being installed on the zipper 28 by the other termination installation member.

As illustrated in FIG. 1, the first slider installation member 16 is installing a slider 48 and the first termination installation member 18 is installing a termination on the zipper 28. While the second slider installation member 116 is being loaded with a slider 48 by the slider insertion tool 128 and the second termination installation member 118 is being loaded with a pair of termination clips 26 by the clip insertion tool 132. The rotor 12 is then rotated 180°. During the rotation, the first and second termination members 18, 118 are retracted and then extended as they approach the zipper 28 and the clip insertion tool 132.

Figure 4:
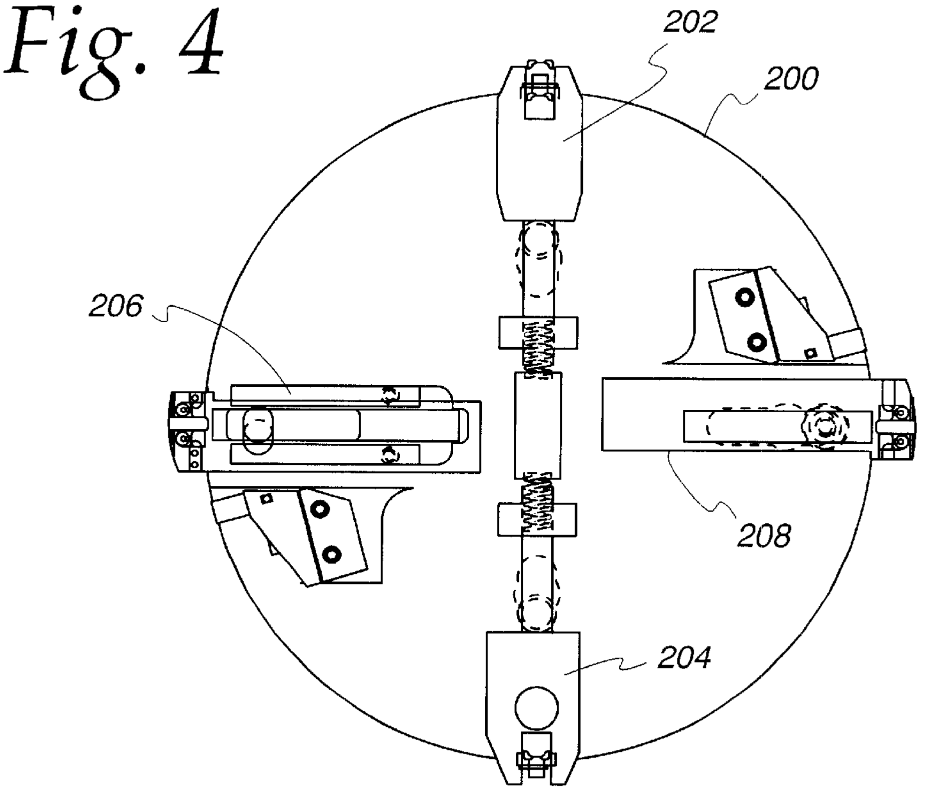
FIG. 4 is a top plan view of a first alternative embodiment of a rotor.

Another embodiment of the installation assembly is illustrated in FIG. 4. This installation assembly has a single rotor 200 that sequentially installs terminations and sliders. The rotor 200 includes first slider installation member 202 and a second slider installation member 204 rigidly mounted on the rotor along a diametric line 180° apart from each other. A first termination installation member 206 is reciprocally mounted on the rotor 200 in the same manner as the first termination installation member 18. The first termination member 206 is located between the first and second slider installation members 202, 204 at a right angle to each of them. A second termination installation member 208 is also reciprocally mounted on the rotor 200 on a diametric line with the first termination installation member 208. The first and second termination installation members 206, 208 are reciprocated by reciprocating assemblies substantially the same as the first and second reciprocating assemblies 24, 124 on the rotor 12 in FIGS. 1–3 and follow a cam track similar to the cam track 42 in FIG. 3.

The installation assembly of FIG. 4 operates first to install a termination such as an ultrasonic weld or a clip on a zipper 28 by one of the first or second termination installation members 206, 208. As this occurs, the other termination installation member is being supplied with an end termination by the insertion tool 132. The alternative rotor 200 is then rotated 90° and a slider 48 is installed on a zipper 28 by one of the slider installation members 202, 204 while the other slider installation member is being supplied with a slider by the slider insertion tool 128.

Figure 5:
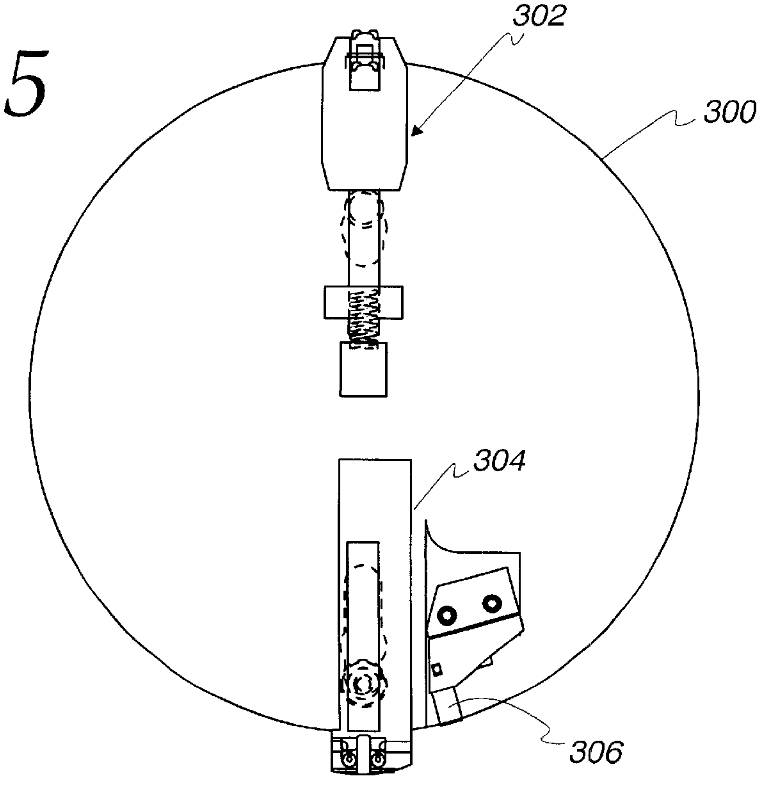
FIG. 5 is a schematic top plan view of a second alternative embodiment of a rotor.

A second alternative rotor 300 is illustrated in FIG. 5. This rotor 300 includes a single slider installation member 302 and a single termination installation member 304 that are identical to the corresponding elements of the installation assembly 10 of FIGS. 1–3 except there is only one slider installation member 302 and one termination installation member 304 located along a diametric line of the rotor 300 and 180° apart. A closing roller 306 substantially the same in structure and function as the closing rollers 52, 152 of FIGS. 1–3 is also provided. In this second alternative embodiment, while one of the installation members 302, 304 is installing a slider or termination on a zipper, the other installation member is being supplied with a slider or termination. The rotor is then rotated 180° for the next installation and supply.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An assembly for installing sliders and end terminations onto a web, comprising:

a base, a cam path in said base;

a rotor mounted on said base;

a first slider installing member on said rotor;

a first termination installing member on said rotor;

one of said first slider installing member and said first termination installing member being secured on said rotor for reciprocal movement; and a cam follower on said rotor positioned in said cam path and attached to said one of said first slider installing member and said first termination installing member secured on said rotor for reciprocal movement.

2. The assembly claimed in claim 1, wherein said first slider installing member is located along a diametric line of said rotor.

3. The assembly claimed in claim 1, further comprising a second slider installing member on said rotor.

4. The assembly claimed in claim 1, comprising a second slider installing member on said rotor, said first slider installing member and said second slider installing member located along the same diametric line of said rotor.

5. The assembly claimed in claim 1, wherein said first slider installing member being rigidly mounted on said rotor and said first termination installing member being reciprocally mounted on said rotor.

6. The assembly claimed in claim 1, wherein said first slider installing member being rigidly mounted on said rotor and said first termination installing member being reciprocally mounted on said rotor, said first slider installing member and said first termination installing member being located on said rotor adjacent to each other.

7. The assembly claimed in claim 1, wherein said first slider installing member being rigidly mounted on said rotor and said first termination installing member being reciprocally mounted on said rotor, said first slider installing member being located diametrically opposed on said rotor from said first termination installing member.

8. The assembly claimed in claim 1, comprising a second slider installing member on said rotor spaced from said first slider installing member, and a second termination installing member on said rotor spaced from said first termination installing member.

9. The assembly claimed in claim 1, wherein said first slider installing member is rigidly mounted on said rotor and said first termination installing member is reciprocally mounted on said rotor, said first slider installing member and said first termination installing member are adjacent to each other for simultaneous installation of a slider and a termination onto a web.

10. The assembly claimed in claim 1, wherein said first slider installing member is perpendicular to said first termination installing member.

11. An assembly for installing sliders and end terminations onto a reclosable zipper, comprising:

a rotor;

a first slider installing member rigidly mounted on said rotor;

a first termination installing member reciprocally mounted on said rotor adjacent to said first slider installing member; and a first reciprocating member coupled to said first termination installing member for reciprocating said first termination installing member into and out of installing engagement with a reclosable zipper.

12. The assembly claimed in claim 11, comprising a second slider installing member rigidly mounted on said rotor at a location opposite said first slider installing member.

13. The assembly claimed in claim 11, comprising a second termination installing member reciprocally mounted on said rotor at a location opposite said first termination installing member, and a second reciprocating member coupled to said second termination installing member for reciprocating said second termination installing member into and out of installing engagement with a reclosable zipper.

14. The assembly claimed in claim 1, wherein said first slider installing member and said first termination installing member are located on said rotor in a position allowing installation of a slider and terminations simultaneously on a reclosable zipper.

15. A method for installing sliders and end terminations on reclosable zippers for plastic bags, comprising:

positioning a reclosable zipper adjacent a rotor, said rotor including a first slider installing member and a first termination installing member, one of said first slider installing member and said first termination installing member being rigidly mounted on said rotor in a position adjacent said reclosable zipper and the other of said first slider installing member and said first termination installing member being reciprocally mounted on said rotor and in a first position spaced from said reclosable zipper;

reciprocally extending said other of said first slider installing member and said first termination installing member to a first position adjacent said reclosable zipper; and installing a slider and a termination onto said reclosable zipper.

16. The method of claim 15, comprising:

reciprocally retracting said other of said first slider installing member and said first termination installing member from said first position to a second position spaced from said reclosable zipper;

rotating said rotor to move said first slider installing member and said first termination installing member away from said reclosable zipper and to a supply source.

17. A method for simultaneously installing a slider and a pair of end termination clips onto a reclosable zipper, comprising:

providing a rotor rotatably mounted on a base;

providing a cam track on said base;

providing a first slider installing member rigidly secured to said rotor;

providing a first clip installing member mounted on said rotor for reciprocal movement;

providing a cam follower secured to said first clip installing member and positioned in said cam track to reciprocate said first clip installing member;

rotating said rotor to position said first slider installing member and said first clip installing member adjacent a reclosable zipper;

extending by said cam follower said first clip installing member toward said reclosable zipper to a first position while rotating said rotor; and installing simultaneously a slider and at least one end termination clip on said reclosable zipper.

18. The method claimed in claim 17 comprising:

rotating said rotor to rotate said first slider installing member and said first clip installing member away from said reclosable zipper and toward a supply of sliders and a supply of end termination clips;

retracting by said cam follower said first clip installing member from said first position into said rotor to a second position;

extending by said cam follower said first clip installing member as said first clip installing member approaches said supply of end termination clips;

loading a slider into said first slider installation member; and loading at least one end termination clip into said first clip installation member.

19. The method claimed in claim 17, comprising opening at least a portion of said reclosable zipper prior to installing said slider and said at least one end termination clip, and closing said reclosable zipper after installing said slider and said pair of end termination clips.

20. The method claimed in claim 17, comprising providing a second slider installing member rigidly secured to said rotor opposite said first slider installing member, and providing a second clip installing member on said rotor opposite said first clip installing member for reciprocal movement.

* * * * *